Feb. 2, 1954  J. T. TUCKER  2,667,937
WALKING VEHICLE
Filed May 24, 1948  5 Sheets-Sheet 1

INVENTOR.
JOHN T. TUCKER
BY M. C. Hayes
ATTORNEY

Feb. 2, 1954  J. T. TUCKER  2,667,937
WALKING VEHICLE
Filed May 24, 1948  5 Sheets-Sheet 2

INVENTOR.
JOHN T. TUCKER
BY M. O. Hayes
ATTORNEY

Feb. 2, 1954  J. T. TUCKER  2,667,937
WALKING VEHICLE

Filed May 24, 1948  5 Sheets-Sheet 3

INVENTOR.
JOHN T. TUCKER
BY
m. q. Hayes
ATTORNEY.

Feb. 2, 1954   J. T. TUCKER   2,667,937
WALKING VEHICLE
Filed May 24, 1948   5 Sheets-Sheet 4

INVENTOR.
JOHN T. TUCKER
BY
ATTORNEY

Feb. 2, 1954 J. T. TUCKER 2,667,937
WALKING VEHICLE
Filed May 24, 1948 5 Sheets-Sheet 5

INVENTOR.
JOHN T. TUCKER
BY
*M. C. Hayes*
ATTORNEY

Patented Feb. 2, 1954

2,667,937

UNITED STATES PATENT OFFICE 2,667,937

WALKING VEHICLE

John T. Tucker, Oxnard, Calif.

Application May 24, 1948, Serial No. 28,961

8 Claims. (Cl. 180—8)

(Granted under Title 35, U. S. Code (1952), sec. 266)

This invention relates to walking vehicles, and more particularly to such vehicles as are amphibious and which travel over land or over marshy areas by the walking action of a pair of pontoon-like members flanking a central body, which vehicle may operate as a water craft by means of a propeller and rudder, selectively lowerable into position at the stern of the vehicle.

It is an object of this invention to provide a vehicle which will travel upon any kind of surface, from water to solid ground, including marshy land of any consistency, and also including sandy beaches having slopes and hills.

More particularly, it is an object of this invention to provide a vehicle which moves over land or marshy ground by a walking action, and which is capable of being made watertight and compartmented for operation as a boat in surfs and rough water.

It is another object of this invention to provide a walking vehicle which may be easily and simply steered and maneuvered over all types of terrain.

It is another object of this invention to provide a walking vehicle capable of walking both forward and backward.

It is a further object of this invention to provide a vehicle especially adapted for operation over marshy and insecure terrain, which vehicle may be used to transfer and convey all manner of operating implements, from derricks, oil tanks and machine shops, to living quarters for personnel.

It is another object of this invention to provide a vehicle for operation over marshy terrain which is especially suited to laying behind it a track or roadway over the marshy terrain.

It is another object of this invention to provide in a walking vehicle sturdy and positive mechanism for successively lifting and depressing a pair of flanking steppers with respect to a central body.

It is an additional object of this invention to so design a walking vehicle that the lifting load and stresses occasioned by the stepping action are more or less evenly distributed over the entire walking cycle, and do not peak unduly at critical phases of the cycle.

It is a further object of this invention to provide an amphibious walking vehicle which will expeditiously push itself off a beach into the water.

It is a still further object of this invention to provide a walking vehicle capable of surmounting obstacles almost as high as its deck.

It is another object to provide an amphibious vessel in which the buoyancy of the vessel and tilt of the driving propeller may be varied to suit loads and navigation conditions.

Other objects and many of the attendant advantages of this invention will be readily appreciated as the same becomes better understood by reference to the following description.

In general the teachings of the instant invention are best suited for embodiment in an amphibious vehicle of the walking type. The vehicle is preferably of the type comprising a pair of bodies interconnected by a driving means which effects relative movement between the two bodies in a closed path lying in a vertical plane. That is to say, the interconnecting driving means first lifts one body with respect to the other, then advances it, then depresses it, in effect raising the other body, and finally advances the other body. In this way, a stepping motion is achieved between the two bodies.

It is preferred to form the vehicle of an inner or central body or member, flanked by an outer body consisting of a pair of outboard members connected by transverse beams. Duplicate interconnecting driving means are placed at each side of the inner body, connecting with the two outboard members to achieve the necessary stepping motion.

It is preferred to dispose the driving means interconnecting the bodies at the forward end of the vehicle, in the form of an ovate gear rack mounted to one body, in which rides a pinion on the end of a shaft mounted on the other body. Relative lifting and advance at the stern of the vehicle is achieved by another interconnecting means which is effective to alternately lift and depress one of the bodies with respect to the other as the driving means effects the relative ovate movement between the two bodies.

The lifting and depressing means at the stern of the vehicle is made preferably in the form of a pair of rails pivoted to the two outboard members adjacent the side of the inner body. The rails are pivoted for oscillation in a vertical plane, and at the ends of the pivoted rails are mounted guide rails, which are in a plane approximately level with the pivot point of the pivoted rails. A horizontal stud extends from each side of the inner body and rides on the pivoted rail, either on the top or bottom surface thereof depending on whether the inner body is being lifted or depressed with respect to the outer body. The pivoted rails are biased in a given direction, so that with each forward stroke of the inner body with respect to the outer body, the studs ride on the top surface of the pivoted rails, effecting lifting of the stern of the inner body with respect to the outer body. Conversely, as the outer body is advanced with respect to the inner body, the studs ride on the undersurface of the pivoted rails, thereby lifting the outboard members with respect to the inner body. In this way the relative motion at the stern of the vehicle between the two bodies is caused to follow generally the same path as that achieved at the bow, but lagging in phase slightly, so that it is not necessary for the driving means to lift both the bow and the stern of either body simultaneously.

Leavening of the lifting load is further accomplished by providing a break in the contour of the hull bottom of both bodies and fairing the hull upward toward the stern. This break is located immediately beneath the fulcrum of the stern lifting means and enables the forward end of each body to be tilted upward as the body starts its upward cycle, without tending to raise the stern end of the other body. The break also provides a pivot point about which the bodies may fulcrum, thereby enabling the load on the stern of the bodies to aid the forward gear mechanism in passing its critical stress point.

A propeller for driving the vehicle in water is provided at the stern and mounted in a frame which rides in a pair of arcuate rails, so that the frame and propeller may be elevated into the body of the vehicle when not in use. The drive shaft of the propeller is suitably hinged at the point where it intersects the axis of curvature of the arcuate guide rails.

Steering pads are hinged dependingly from under the stern of each of the outboard members, the relative position of the pads beneath the members being adjustable, so that the amount of drag imposed by a given pad on its outboard member determines the sharpness with which the vehicle turns.

In accordance with the invention as described generally above, a particular embodiment has been shown in the accompanying drawings, wherein.

Referring to the drawings, 21 (Fig. 1) denotes an inner or central body which is disposed adjacent an outer body 22, the latter being in the form of a pair of outboard or outer members 23 and 24 flanking the inner body 21. Fore and aft of the vehicle, the members 23 and 24 are joined by transverse beams 26 and 27, respectively, thereby forming the outer body 22 into a unitary structure.

Figures 1, 5:
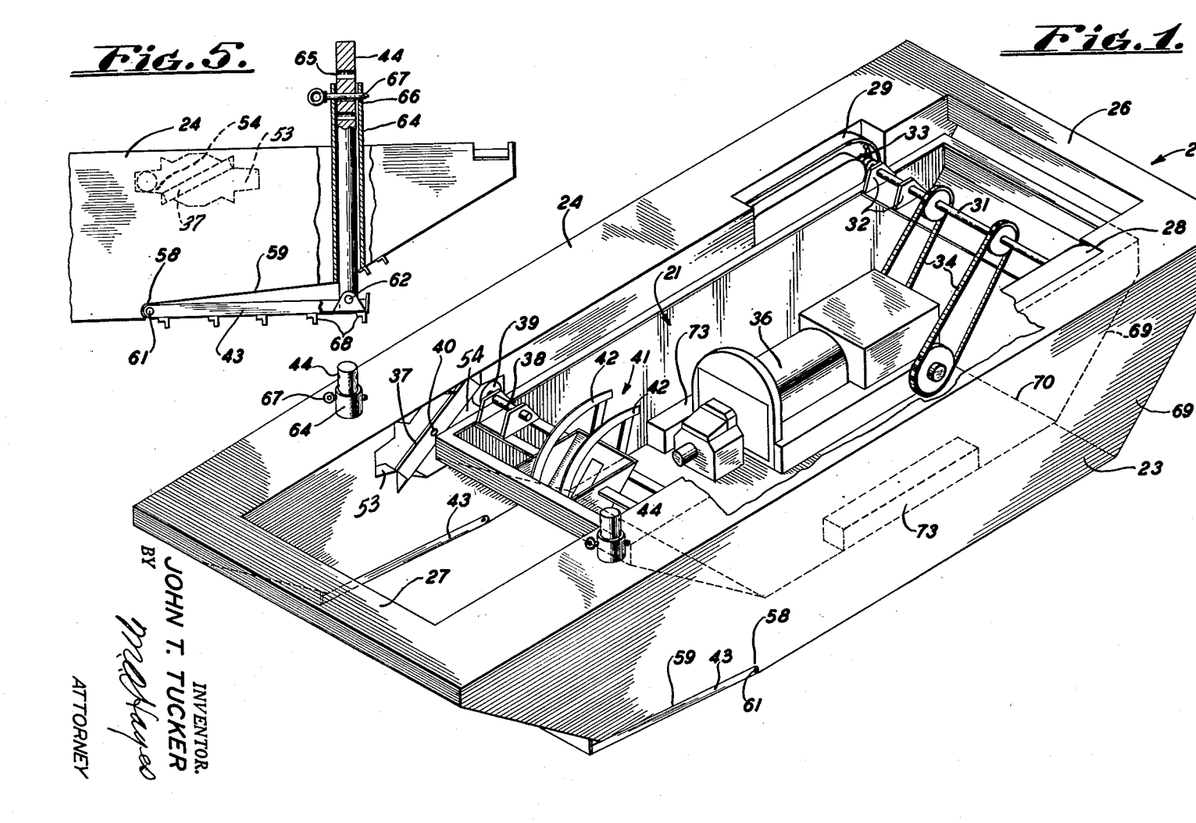
Fig. 1 is an isometric view of the vehicle showing the principal operating elements.
Fig. 5 is a partially sectioned view showing one of the steering members or pads used to steer the vehicle when it is walking.

At their forward ends, the outboard members 23 and 24 are provided with driving means interconnecting them with adjacent portions of the inner body 21. This means assumes the form of ovate gear racks 28 and 29, respectively, mounted in vertical planes in the members 23 and 24, respectively, adjacent the sides of the inner body 21. The gear teeth are directly inwardly of the oval. A shaft 31 is journaled transversely of the body 21, by means of bearings 32, and has at each end thereof a pinion 33 meshing in the respective gear racks 28 and 29. The shaft 31 is driven through chain drives 34 by a suitable source of power such as an engine 36.

The driving means including the gear racks 28 and 29 and the driving shaft 31 thus cause the two bodies 21 and 22 to be interconnected for relative movement in a closed path lying in a vertical plane, in this case the closed path being an oval, or elongate circle, as seen from the shape of the gear racks 28 and 29. As the shaft 31 rotates counterclockwise in Fig. 1, the outer body 22 is first lifted at the bow with the respect to the body 21, and is then advanced, thus effecting the first phase of the step. As the pinions 33 reach the rearward end of the gear racks 28 and 29, the two bodies are returned to the same level. Then the inner body 21 begins to lift within the outer body 22, and is advanced with respect to the outer body, as the pinions 33 ride in the upper part of the gear racks 28 and 29.

While this motion is being effected between the bodies at the forward end of the vehicle, it is necessary that the stern ends of the two bodies also be lifted and depressed in a generally similar manner. To this end means are provided interconnecting the bodies at the stern, effective to alternately lift and depress one of the bodies with respect to the other as the driving means at the forward end of the vehicle effects the relative movement just described. This means assumes the form of a pair of rails 37, one in each of the outboard members 23 and 24, which are pivoted for oscillation in a vertical plane, and are disposed, as are the gear racks 28 and 29, adjacent the sides of the inner body 21. Riding on the rails 37 are rollers 39 on the ends of studs 38, which are mounted on and project from each side of the inner body 21 near the stern thereof.

For driving the vehicle as a water vessel, a rudder skeg 41 is provided, including a pair of arcuate guide rails 32, by means of which the rudder may be raised into the interior of the body 21 when the vehicle is in use as a land craft. For steering the vehicle as it walks, a pair of steering pads 43 are hinged dependingly from the stern of the outboard members 23 and 24, respectively. The spacing between the pads 43 and their respective outboard members is adjustable and is determined by means of vertical steering posts 44, which are secured to the pads 43 and extend upwardly through the interior of the members 23 and 24.

*Interconnecting means*

The means interconnecting the two bodies will be particularly described with reference to Figures 2, 3, and 4 reverting also to Fig. 1.

Figures 2, 3, 4, 7:
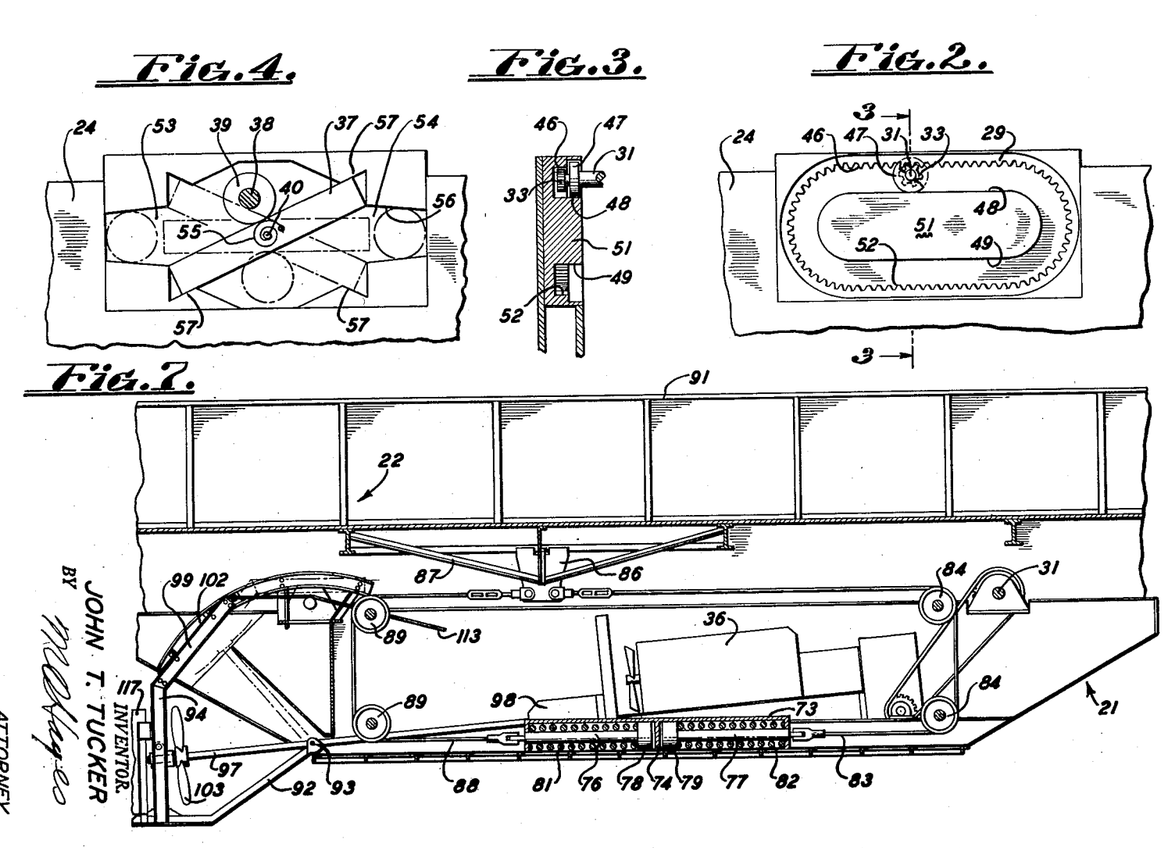
Fig. 2 is a fragmentary view, showing one of the driving means interconnecting the two bodies forming the vehicle.
Fig. 3 is a section taken along line 3—3 of Fig. 2.
Fig. 4 is a fragmentary view showing the means at the stern of the vehicle for alternately lifting and depressing one of the bodies with respect to the other.
Fig. 7 is a longitudinal, sectioned view showing a portion of the interior of the vehicle—

Referring to Fig. 2, one of the gear racks 29 is shown secured to the outboard member 24. The pinion 33 is shown in mesh with the teeth 46 in the upper portion of the gear rack 29. The weight of the forward end of the inner body 21 is supported through the shaft 31 by the riding of a roller 47 (Figs. 2 and 3) on a track 48 positioned within the gear rack 29 and jutting out therefrom. The roller 47 is placed on the shaft 31 just behind the gear 33. In this way the gear 33 need only serve to effect the relative movement between the two bodies, and need not support the weight thereof. During the other portion of the driving cycle, i. e., when the outboard body 22 is being lifted and advanced with respect to the inboard body 21, the roller 47 rides on the undersurface 49 of the projecting portion 51, the upper surface 48 of which forms the trackway for the roller 47 during advance of the inner body 21.

It will now be seen with reference to Fig. 2 that as the shaft 31 is caused to rotate counterclockwise by means of the engine 36, the pinion 33 meshes with the gear teeth 46; and with its weight supported on the roller 47 and the trackway 48, the inner body 21, which is elevated with respect to the outer body 22, is advanced with respect thereto. At the forward end of the trackway 48, the roller 47 is lowered in the semicircular path formed at the end of the gear rack 29, and in the last half of the semi-circular traverse the outer body 22 is lifted with respect to the inner body 21. When the gear 33 has reached the lower right hand corner of the gear track 29, the bow of the outer body 22 has been lifted with respect to the inner body 21, and is ready to be advanced with respect thereto by the gear 33 meshing with the lower portion 52 of the rack teeth. The weight of the outer body 22 during this traverse is taken up by the roller 47 riding on the under surface 49 of the projecting portion 51 of the gear rack 29.

While the bows of the two bodies 21 and 22 are going through their relative cycles of lifting, advance, depression, and retreat, it is necessary that the sterns of the two bodies go through a generally similar relative cycle in order that the stern of the vehicle will not drag. At the same time, it is desirable that the lifting and depressing phases of the cycle be out of phase with the similar phases at the bow of the vehicle, in order to evenly distribute the load on the driving engine, so that it will not be forced to lift the entire weight of either body at one time.

This is achieved by the lifting means including the pivoted rail 37 alluded to hereinbefore, and shown more particularly in Fig. 4. In this figure, one of the rails is shown pivoted by a pin 40 to the member 24, immediately adjacent the side of the inner body 21 at the stern thereof. Guide rail means 53 and 54 are mounted to the outboard member 24 beyond each end of the rail 37, and serve to receive the roller 39 when the latter shifts from the top surface of the rail 37 to the bottom surface thereof, or vice versa. Suitable means, shown in Fig. 4 schematically as a spring 55, serves to bias the pivoted rail 37 in a counterclockwise direction. When it is desired to drive the vehicle backward, the biasing means is reversed so that the rail 37 is biased clockwise.

It will be seen with reference to Figs. 4 and 1 that as the driving means at the forward end of the vehicle lifts the outboard body 22 with respect to the inboard body 21, the roller 39 remains substantially stationary in the guide rail means 54, inasmuch as during this lifting operation there is little relative longitudinal motion between the inner and outer bodies. As the gear 33 reaches the forward end of the rack section 52, appreciable forward motion of the outer body 22 with respect to the inner body 21 commences. This pulls the pivoted rail 37 forward with respect to the roller 39, so that the latter in effect rides on the under face 56 of the guide rail means 54, and thence on to the undersurface of the pivoted rail 37. Stop means 57 on the outboard member 24 serve to limit the oscillation of the pivoted rail 37, so that the latter rides up and over the roller 39, until the roller reaches a point immediately beneath the pivot pin 40. From there on, the weight of the outer body 22 causes the pivoted rail 37 to pivot clockwise about the pivot pin 40. The roller 39 continues to ride on the undersurface of the rail 37, but now the slope of the rail 37 is downward, so that the stern end of the outer body 22 is gradually lowered until it reaches a point level with that of the inner body 21, and the roller 39 enters the after guide rail means 53. As the roller 39 clears the after end of the rail 37, the latter is returned to its former counterclockwise position by the bias 55, so that the upper surface of the rail 37 is now ready to receive the roller 39.

By this time, the pinion 33 is in the after end of the gear rack 29, and is ready to effect lifting motion of the inner body 21 with respect to the outer body 22. As this is done, the roller 39 remains substantially stationary in the guide means 53, but as soon as the pinion 33 reaches the rearward end of the upper tooth portion 46, forward motion or advance of the inner body 21 with respect to the outer body 22 commences. The roller 39 is then drawn out of the guide means 53 onto the upper surface of the rail 37, so that lifting of the stern end of the inner body 21 is achieved, until the roller 39 is over the pivot pin 40. At this point the weight of the inner body 21 causes the rail 37 to pivot clockwise against the bias 55, and the roller 39 continues forwardly, this time sloping downwardly and gradually lowering the inner body 21 until the roller 39 enters the guide means 54 to complete a stepping cycle.

It will thus be seen that the stern of the vehicle is alternately lifted after the corresponding lifting of the forward end, so that the load on the engine 36 is more evenly distributed and does not peak at one portion of the stepping cycle as would be the case were the entire lifting phase of the stepping cycle to be achieved in one operation.

The lifting load is further evened by providing a break in the contour of the undersurface of the hull of each body, so that as the lifting of the body commences it pivots about this edge as a fulcrum. The break in the outboard body 22 is shown at 58 in Figs. 1 and 5. Proceeding sternward from the edge 58 the bottom slopes upward as shown at 59. The edge 58 is preferably located directly beneath the forward roller guide means 54.

The edge 58 comes into play as the pinions 33 enter the forward arcuate portions of the racks 28 and 29, particularly the lower half of the racks. At this point in the cycle the forward portion of the outboard body 22 begins to lift, the entire body pivoting about the rollers 39 in the guide means 54.

It will now be manifest why the optimum location of the break 58 is directly below the guide means 54. Were it to be located aft of this location, the pivoting action would tend to drive the stern of the body 22 down into the mud and thus increase the drag as the body advanced with respect to the inner body 21. Conversely were the break 58 to be located forward of this location, the pivotal lifting action would raise the body 22 entirely off the ground since the edge 58 would swing free of the surface. This would place a detrimental burden on the engine 36 and on the teeth of the pinion 33 and the rack 29.

Another advantage of breaking the hull contour as at 58 is to permit the load on the deck of the body 22 aft of the break 58 to aid in raising the forward end by fulcruming the body 22 on the ground using 58 as a pivot edge.

The inner body 21 may likewise be faired upwardly at the stern if desired, the break being located directly below the rollers 39.

Steering members

Steering mechanism for the vehicle is shown in detail in Fig. 5, wherein 43 shows one of a pair of steering pads, in this case the one depending from the port outboard member 24. The pad 43 is in the form of a flat plate hinged at 61 to the underside of the member 24. To the aft end of the pad 43 is attached by a pivot pin 62 the steering post 44, which extends upwardly in a tube 64 passing through the stern of the outboard member 24. The upper end of the post 44 is provided with a plurality of diametral holes 65 and the tube 64 has a registering hole 66 through which holes may be passed a large anchoring pin 67, which thus serves to selectively lock the post and the tube together in predetermined relation, thereby determining how far below the bottom of the member 24 the pad 43 will be positioned.

When it is desired to turn, for example to the left, the post 44 in the port outboard member 24 is allowed to drop downward in the tube 64 when the stern of the outboard body is raised to its high posiiton; and the pin 67 is placed through the tube holes 66 and a registering port hole 65. In this way, there will be imparted to the port member 24 as the outer body 22 is lifted and advanced, a drag which will cause the entire vehicle to swing slightly to the left. The amount of drag and hence the sharpness of the turn is determined by the distance which the pad 43 is positioned beneath the stern of the member 24. If the pin 67 is placed in the upper of the holes 65, then an appreciable drag will be imparted to the outboard member 24 and the turn will be sharp. Conversely, if the pin 67 is placed in one of the lower holes 65, the post 44 will be held high up in the tube 64, thereby holding the pad 43 flush against the bottom of the member 24, and no drag at all will be imparted.

It will be understood that right turns are achieved in a similar manner by operation of the starboard post 44. If desired, the dragging may be enhanced by cleating the underside of the pads 43 with transverse angle irons 68. The full extent of the pads 43 is best seen in the under view of the vehicle Fig. 6.

Traction means

Vehicles of the present type are best suited for operation over marshes and muddy terrain where land craft cannot operate because the ground is too soft, and where water craft cannot operate because the conventional propeller means will not operate in any thing but a true liquid. In terrain of such consistency, however, the problem of traction becomes a vital one. In the solution of this problem the vehicle embodying the instant invention has been provided on the undersurface thereof with a plurality of cleats 71 best shown in Fig. 6. These cleats are preferably in the form of rectangular wooden timbers, placed in chevron fashion transversely on the bottom of both the inner body 21 and the outer body 22. In travelling over mud of particularly tenacious consistency, even greater traction means is sometimes required. This is provided in the instant invention in the form of transverse mud fins which may be selectively projected downwardly at the bow of each of the two bodies 21 and 22. Numeral 72 designates such a fin from the member 24 in extended position, it being understood that the other two fins, i. e., that in the inner body 21 and in the starboard member 23, are in retracted position.

Figures 6, 10, 11:
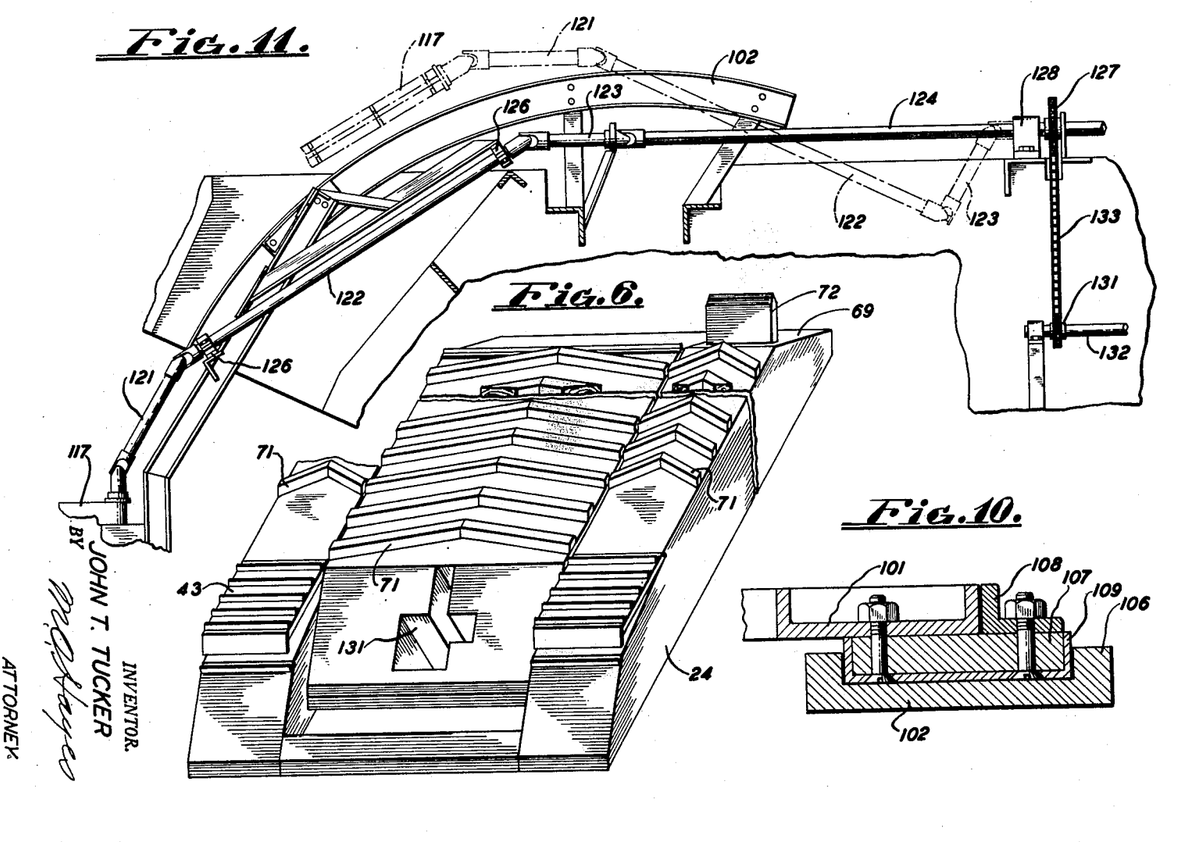
Fig. 6 is a view of the underside of the vessel.
Fig. 10 is a fragmentary section taken along line 10—10 of Fig. 9.
Fig. 11 is a substantially median longitudinal section of the inner body, showing the rudder turning means.

These fins are selectively lowered and raised with each step to maintain traction on whichever body is supporting the load. That is to say, as the inner body 21 moves forward, its fin is retracted, while the two fins in the outboard members 23 and 24 are extended downwardly into the mud. Conversely, when the outer members 23 and 24, i. e., the outer body 22, is being advanced, the outer two fins are retracted, while the inner fin, depending from the body 21, is extended to hold it firm to the surface. The fins may be operated by any suitable means; it has been found that hydraulic means is to be preferred.

The bodies 21 and 22 are so arranged that when their bottoms are on the same level, one of the bodies projects a few inches beyond the other at the bottom. For example with the bodies in the relative positions shown in Fig. 1, the forward bottom edge 70 of the inner body 21 projects a few inches beyond the corresponding edge of the outer body 22. This feature insures that the vehicle will always be able to shove itself off from the beach as it enters the water, stern first. Stern first entry is preferred in order that the rudder and propeller may be instantly available to assume control when the vessel is water borne. If the body 21, which is shorter than the body 22, were to terminate coincident with the body 21 instead of being slightly longer (or shorter), then a condition might be encountered where the outboard body was just hung on the beach by its forward edge, and the inner body would step uselessly, being unable to effect the final push needed to float the vessel.

The bodies 21 and 22 are arranged at the stern so that with the former at its extreme rearward position, its bottom edge also projects a few inches beyond the outboard body 22 so that the final push may be achieved whether the vessel backs or fronts into the water.

The same slight mismatch in leading edges assures the craft will always be able to lift itself onto a beach from the water even though the initial beaching be incomplete.

Another feature enhancing the universality of the vehicle is the sloping nature of the forward portion of the bottom. As shown at 69 in Figs. 1 and 6, the bottom of both bodies, which are generally flat, are sloped upward at the bow of the vehicle at about 30° from the horizontal. The surfaces 69 constitute an inclined plane by means of which the vehicle may force itself up and over any wall or similar obstruction which is lower than the forward edge of the sloped surfaces 69.

The centering spring

The lifting operation of one body with respect to the other places a considerable peak load on the engine 36 and on the teeth of the pinions 33 and the racks 28 and 29. To lighten this load, heavy spring means are provided interconnecting the inner and outer bodies, and urging the two bodies to the relative mid-position; that is a position where the inner body is neither advanced nor retreated longitudinally with respect to the outer body, and vice versa. In this way, as the pinions 33 complete their climb around the arc of the gear racks 28 and 29, and as the rollers 39 effect the relative upward motion at the stern of the vessel, the spring means is returned to normal position, and the force exerted thereby lightens the load on the engine. Energy is restored in the spring means as the two bodies move away from their relative longitudinal mid-position.

Two springs are provided constituting this spring means, one at each side of the inner body 21. Each spring, for example the starboard spring shown in Fig. 7, includes an elongate housing 73 mounted longitudinally on the bottom of the inner body 21. The housing 73 is divided in two by a transverse partition 74, and in each half there reciprocates a shaft 76 and 77, respectively. Compressed between washers 78 and 79 on their respective shafts and the corresponding end wall of the housing 73 are a pair of very strong springs 81 and 82. To the extended end of the shaft 77 is attached a cable 83, which passes forwardly and upwardly over sheaves 84, journaled on the body 21, and then back amidships of the vessel, where it is secured to a plate 86, mounted to a framework 87, depending from the outboard body 22. Similarly, the shaft 76 extending sternward has secured to it at its outer end another cable 88, which passes upwardly over sheaves 89, and thence forwardly amidships, where it too is secured to the plate 86.

In the position shown in Fig. 7, the two bodies are centered, i. e., the gear 33 is midway along either the upper gear section 46 or the lower gear section 52 (Fig. 2). Assume that the gear 33 is meshed with the upper or the straight sections 46. This means that the inner body 21 is elevated, and is being advanced with respect to the outer body 22. As the advance continues, the cable 83 tightens, compressing the spring 82, and storing energy therein; while the cable 88 correspondingly slackens. At the end of the stroke, when the pinions 33 are in the extreme forward end of the gear racks 28 and 29, spring 82 is compressed to a maximum. At this point, the two bodies 21 and 22 are on the same level. Then, as the outer body 22 begins to rise with respect to the inner body 21, the spring 82 begins to return its stored energy, and aids in the lifting operation. The energy is steadily returned until the pinion 33 reaches the mid-point of the lower rack section 52, at which point both springs 81 and 82 are in relaxed position.

The other half of the cycle is repeated in the same way, except that it is the spring 81 which is compressed and which releases its energy to aid in lifting the inner body 21 with respect to the outer body 22, as the pinion 33 traverses the rearward end of the racks 28 and 29.

In practice, it is preferred to deck over the outer body 22, as shown at 91, thereby completely covering the hold of the inner body 21, which contains the operating machinery, and provides a loading space for the useful load.

The skeg

Figures 8, 9:
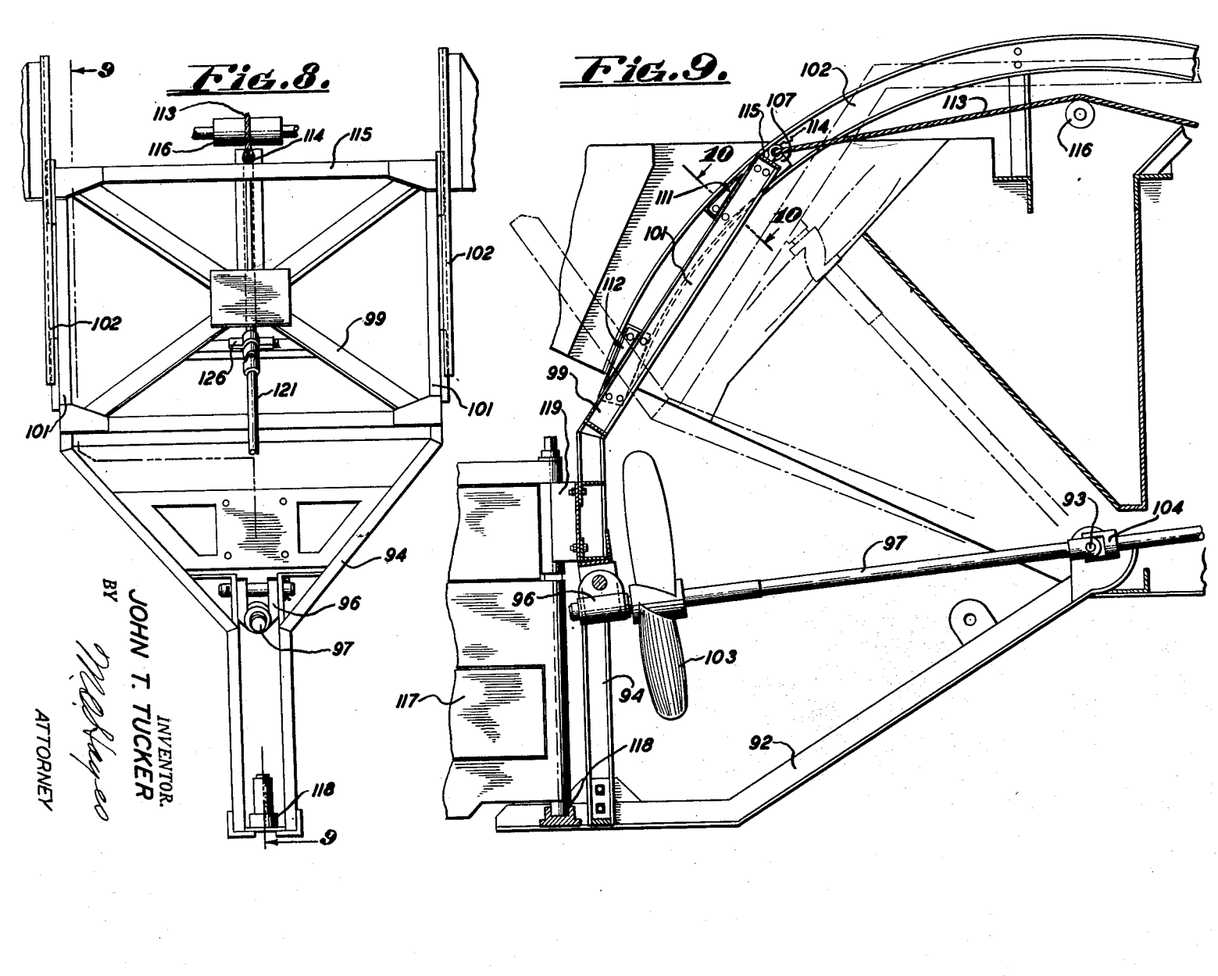
Fig. 8 is a rear view of the propeller skeg employed to drive the vessel in water with the rudder and propeller removed.
Fig. 9 is a longitudinal section taken along line 9—9 in Fig. 8 showing the skeg, all parts being in section except propeller, shaft, and rudder.

The skeg for mounting the propeller and rudder, used when the vehicle is employed as a water vessel, will now be described. Referring to Fig. 7, an angular plate 92 is shown pivoted at the end of the keel by a horizontal pivot pin 93, so as to be pivotable in a vertical plane longitudinally of the vessel. A frame 94 is secured to the plate 92, and is disposed substantially vertical when the skeg is in lowered or extended position. As shown in Fig. 8, the frame 94 is disposed transversely of the vessel, and carries, by means of a bearing trunnion 96, the extreme end of a propeller shaft 97, which is disposed amidships at the bottom of the vessel, and which inclines slightly upward as it extends into the center of the hold, the inner end of the shaft being connected to a transmission system 98, driven from the engine 36. The frame 94 continues upwardly and includes a braced portion 99, the outer edge beams 101 of which are guided by a pair of arcuate rails 102, disposed in parallel vertical planes at the stern of the vessel, the axis of curvature of the arcs coinciding with that of the pivot pin 93. It will be thus seen that the propeller 103 secured to the shaft 97 just inside the bearing trunnion 96, may be selectively raised into the body 21, or lowered sternwardly into operating position by rotation of the assembly 92—94—99 about the pivot point 93. The shaft 97 passes through the axis of curvature of the arcuate rails 102, and is hinged by being provided with a universal joint 104 at its intersection with this axis.

The manner in which the side beams 101 of the frame 99 are mounted in the rails 102 is best seen in Fig. 10, which is a section taken along line 10—10 of Fig. 9. As seen in Fig. 10, the rails 102 are provided with inwardly extending guide portions 106, which serve to restrain a block 107, to which are secured the outer channel beams 101 of the frame 99. A triangular sliver 108 cut from a piece of an angle iron is secured also to the block 107 to brace the channel beams 101 thereto. The block 107 is preferably faced with a channel of brass 109 where it rubs against the rails 102. The edge channel beams 101 of the frame 99 are preferably positioned to form a chord across the arcuate rails 102, and a mounting similar to that shown in Fig. 10 is provided at each intersection 111 and 112.

The skeg is raised and lowered by a cable 113, secured to an eye-bolt 114, anchored at the midpoint of the top transverse member 115 of the frame 99. The cable 113 passes over a roller 116, from which it disengages as the skeg approaches the inner extremity of its arcuate movement. The cable may be drawn by any suitable means.

The skeg also carries a rudder 117, the lower edge of which is journaled at 118 in the angular member 92 outwardly of the propeller 103, the upper end being journaled in a bearing 119, extending outwardly from the frame 94. The means for turning the rudder 117 is shown particularly in Fig. 11, and includes a series of shafts coupled together by universal joints, and so arranged that the rudder and shaft assembly may be retracted as the skeg is raised into the vessel. The rudder shaft consists of a plurality of shaft segments, 21, 122, 123, and 124, coupled together by universal joints, and disposed generally in an arcuate pattern following the contour of the rails 102. The shaft 122 is journaled at each end in bearings 126 secured by suitable framework to the general skeg frame 99.

The shaft 124 is of square cross section, and mates within a driving sprocket 127 journaled in a bearing 128 secured to the inner body 21. As the skeg is raised or retracted, the shaft 124 is free to slide within the sprocket 127; and the shaft sections 121, 122, and 123 collapse to the positions shown by the dashed lines. Before retraction of the skeg, the rudder 117 is turned athwartship so that it may be received in a transverse well 131, formed at the stern of the vessel (see Fig. 6). The driving sprocket 127 is suitably actuated from a sprocket 131 and a shaft 132 through a chain 133.

When the vessel is water borne, its draft may be controlled within limits by positioning the inner body 21 at any desired point in its movement cycle within the outboard body 24. For example, with a light load on the deck 91, it might be desirable to raise the body 21 within the body 22, by positioning the gear 33 at the center of the top portion of the racks 28 and 29, as shown in Fig. 2. Conversely, with a heavy load, the draft of the vessel can be decreased by lowering the gear to the vertical portion of the rack 29, midway between the upper rack portion 46, and the lower rack portion 52, thereby making the bottom of the body 21 flush with the bottom of the body 22.

A further navigation advantage lies in the ability of the inner body 21 to be tilted within the body 22. By leaving the body 21 tipped back in the body 22, the propeller 103 is lowered further into the water, thereby minimizing danger of the propeller churning the air as the vessel pitches.

*Adaptations of the vehicle*

Figure 12:
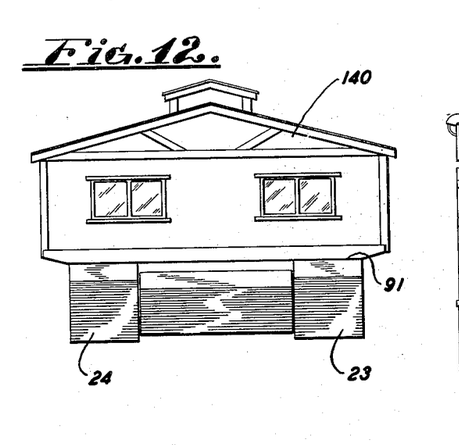
Fig. 12 shows the manner in which the vehicle may be used as living quarters for personnel.

In Fig. 12 the vehicle is shown with a house or barracks 140 mounted on the decking 91 covering the outboard body 23 and 24.

Figure 13:
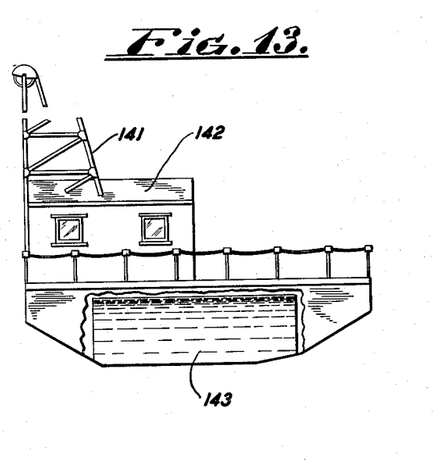
Fig. 13 shows the vehicle with a derrick mounted thereon.

In Fig. 13 the vehicle is shown employed supporting a derrick 141, and suitable operating house 142. Oil may be stored in a tank 143 in the hold if desired.

Figure 14:
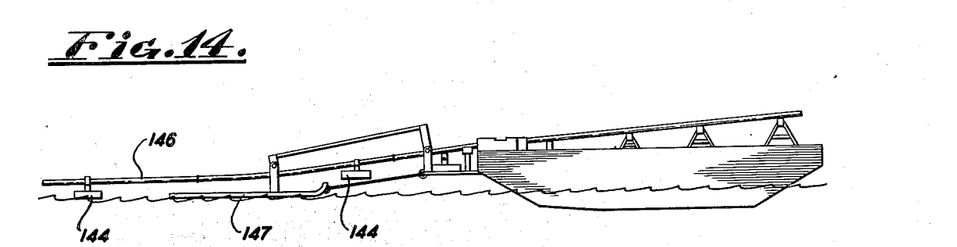
Fig. 14 shows the vehicle with pipeline-laying attachment.

In Fig. 14, the vehicle is shown in use as a water vessel for the laying of a pipe line 146 supported by floats 144, the welding of the pipe sections being achieved successively as the vessel moves forward and lays out the pipe line 146 with the floats 144 already secured thereto. A trailing float 147 is drawn by the vessel to assist in lowering the pipe line.

Figure 15:
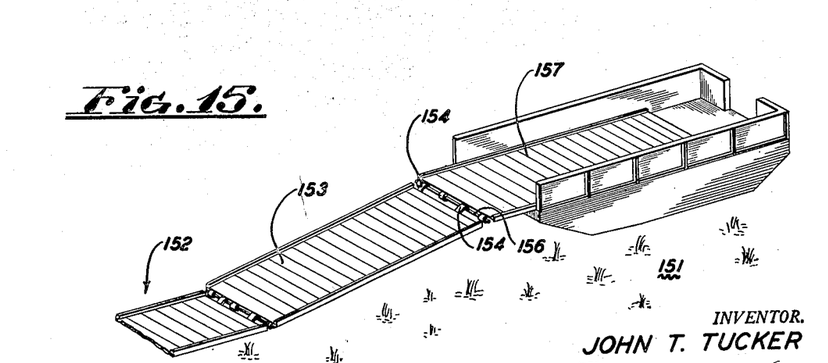
Fig. 15 shows the vehicle with roadway laying attachments for laying a roadway over marshy or insecure terrain.

In Fig. 15, the vessel is shown in use walking over marshy land or tundra 151, and laying behind it continuously a plank roadway 152. As the vehicle advances an upper plank, 153, for example, slides over the edge of the remaining planks, hooks 154 on the forward end thereof catching over a transverse bar 156 on the after end of the next succeeding plank 157 immediately beneath, in turn dragging the plank 157 from the deck of the vehicle. In this way, only one plank need be started, the remaining planks being automatically caught and drawn from the vehicle in a continuous chain, laying behind the craft a solid roadbed for ordinary wheeled vehicles to pass over the tundra 151.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. In a walking vehicle having a pair of bodies with means for moving them longitudinally relative to each other, a rail pivoted to one of said bodies adjacent the other of said bodies for oscillation in a vertical plane, guide rail means mounted to said one body beyond the end of said pivoted rail, said guide rail means being in a plane approximately level with the pivot point of said pivoted rail, and a horizontal stud extending from the side of said other body and a roller on said stud riding against said pivoted rail and said guide rail means for relative lifting and lowering movement between said bodies as they are moved longitudinally relative to each other.

2. In a walking vehicle having an inner body within an outer body with means for moving them longitudinally relative to each other, the outer body comprising a pair of members joined together and flanking said inner body, a pair of rails pivoted to one of said bodies adjacent the other of said bodies for oscillation in a vertical plane, guide rails mounted to said one body beyond the ends of said pivoted rails, said guide rails being in a plane approximately level with the pivot point of said pivoted rails, and horizontal studs extending from the sides of said other body and rollers on said studs riding against said pivoted rails and said guide rail means for relative lifting and lowering movement between said bodies as they are moved longitudinally relative to each other.

3. In a walking vehicle having an inner body within an outer body with means for moving them longitudinally relative to each other, the outer body comprising a pair of members joined together and flanking said inner body, a pair of rails pivoted respectively to said members adjacent said inner body for oscillation in a vertical plane, guide rails mounted to said members beyond the ends of said pivoted rails, said guide rails being in a plane approximately level with the pivot point of said pivoted rails, and horizontal studs extending from the sides of said inner body and rollers on said studs riding against said pivoted rails and said guide rail means for relative lifting and lowering movement between said bodies as they are moved longitudinally relative to each other.

4. In a walking vehicle according to claim 1, stop means on said one body to limit oscillation of said pivoted rail as it pivots between extreme positions.

5. A walking vehicle comprising a first body having a bottom, a second body having a bottom, said second body positioned beside said first body, driving means at one end of said bodies including means interconnecting them for relative vertical and longitudinal movement in a closed path lying in a vertical plane, power means in one of said bodies for applying power to said driving means, and relatively movable means interconnecting said bodies at the other end thereof operable to alternately lift and depress said end of one of said bodies with respect to the other as said driving means effects said relative longitudinal movement, the bottom in at least one of said bodies formed to provide a break in the contour thereof positioned vertically below said second named interconnecting means and a portion of said bottom adjacent the break sloping upwardly toward said other end.

6. A walking vehicle comprising a first body, a second body beside said first body, driving means at one end of said bodies including means interconnecting them for relative vertical and longitudinal movement in a closed path lying in a vertical plane, power means in one of said bodies for applying power to said driving means, and relatively movable means interconnecting said bodies at the other end thereof operable to alternately lift and depress said end of one of said bodies with respect to the other as said driving means effects said relative longitudinal movement, said second named relatively movable interconnecting means including rails pivoted to said first body adjacent said second body for oscillation in a vertical plane, guide rails mounted to said first body beyond the ends of said pivoted rails, said guide rails being approximately level with the pivot point of said pivoted rails, and horizontal studs extending from the sides of said second body and having rollers riding on said pivoted rails and said guide rails.

7. A vehicle according to claim 6 wherein at least one of said bodies has a break in the contour of its bottom, with the bottom being sloped upwardly toward said other end, said break being located directly beneath one of said guide rail means.

8. A walking vehicle comprising a first body, a second body beside said first body, driving means at one end of said bodies including means interconnecting them for relative vertical and longitudinal movement in a closed path lying in a vertical plane, power means in one of said bodies for applying power to said driving means, and relatively movable means interconnecting said bodies at the other end thereof operable to alternately lift and depress said end of one of said bodies with respect to the other as said driving means effects said relative longitudinal movement, said second named relatively movable interconnecting means including rails pivoted to said first body adjacent said second body for oscillation in a vertical plane, guide rails mounted to said first body beyond the ends of said pivoted rails, said guide rails being approximately level with the pivot point of said pivoted rails, means to limit the respective ends of said pivoted rails as they pivot between extreme positions, and horizontal studs extending from the sides of said second body and having rollers riding on said pivoted rails and said guide rails.

JOHN T. TUCKER.

References Cited in the file of this patent
UNITED STATES PATENTS

| Number | Name | Date |
|---|---|---|
| 939,878 | Urie | Nov. 9, 1909 |
| 1,267,033 | Wilson | May 21, 1918 |
| 1,306,644 | Tibbits | June 10, 1919 |
| 1,317,465 | Turnbull | Sept. 30, 1919 |
| 1,320,697 | Larson | Nov. 4, 1919 |
| 1,473,832 | Park | Nov. 13, 1923 |
| 1,500,723 | Roy | July 8, 1924 |
| 2,381,235 | Tucker | Aug. 7, 1945 |
| 2,400,132 | Porter | May 14, 1946 |